March 8, 1932.  E. F. LOWEKE  1,848,428
BRAKE SHOE CONSTRUCTION
Filed Jan. 24, 1930   2 Sheets-Sheet 1
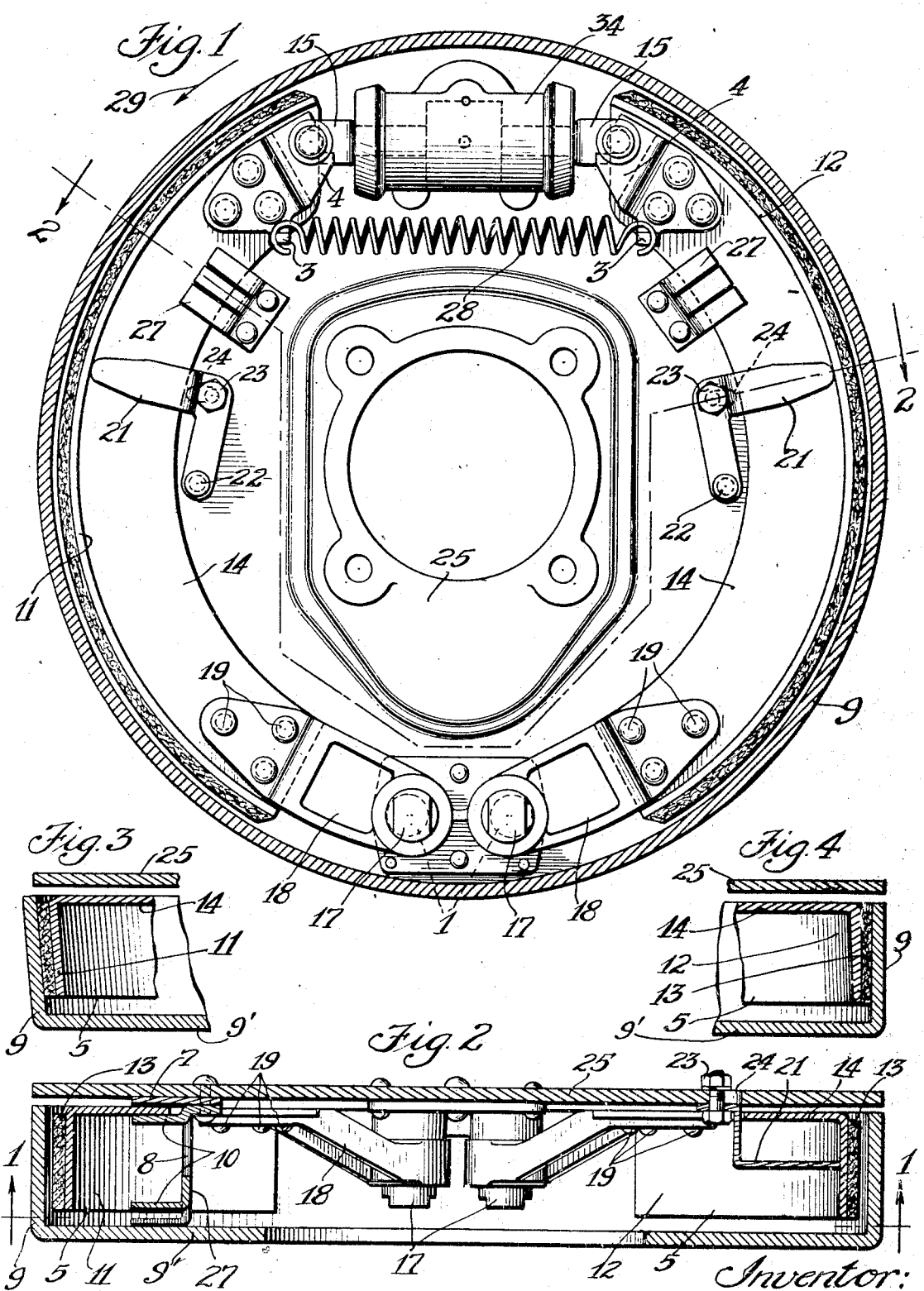

March 8, 1932.  E. F. LOWEKE  1,848,428
BRAKE SHOE CONSTRUCTION
Filed Jan. 24, 1930   2 Sheets-Sheet 2

Inventor:
Erwin F. Loweke
By Williams, Bradbury, McCaleb & Hinkle
Attys.

Patented Mar. 8, 1932

1,848,428

UNITED STATES PATENT OFFICE

ERWIN F. LOWEKE, OF DETROIT, MICHIGAN, ASSIGNOR TO HYDRAULIC BRAKE COMPANY, OF DETROIT, MICHIGAN, A CORPORATION OF CALIFORNIA

BRAKE SHOE CONSTRUCTION

Application filed January 24, 1930. Serial No. 423,042.

This invention relates to brake mechanisms, and more particularly to the type ordinarily employed by motor vehicles.

The ordinary brake drum is relatively non-yieldable on the side attached to the wheel or other rotating member, as compared with the side spaced from the wheel, and when the brakes are forcibly applied, there is a tendency for the free edge of the drum to be deflected out of true cylindrical shape by reason of the pressure of the brake shoes. This condition is greatly augmented by continuous application of the brakes on account of the rising temperature of the drum due to friction. This deformation of the brake drum causes uneven wear on the brake lining or brake shoe if no lining is employed, resulting in uneven application of the brakes, vibration, noise, rapid deterioration of the brake lining and brake shoe, excess wear of the brake shoe pivots and the loss of approximately 25% of the braking torque.

An object of this invention is the provision of a brake mechanism which will effectively overcome the above disadvantages, resulting in a smooth application of the brakes, increased life of the brake lining and increased and steady braking torque.

A further object of this invention is the provision of a brake mechanism in which the brake shoes are made of such size and cross section that they readily conform to the deformation of the drum and exert an equal pressure across their width when the drums are deformed as well as when the drums are in true cylindrical form.

These objects are accomplished by the construction of drums and shoes which are mutually adapted to each other, and made of different rigidities and so mounted and disposed for cooperation, that the less rigid edge of the drum is engaged by a reinforced edge of the shoe. It has been determined from experiment that in order to obtain the desired results, the application of pressure to the shoes must be to the reinforced edge adjacent the less rigid edge of the drum.

In the accompanying drawings illustrating the preferred embodiment of my invention, Figure 1 is a sectional view through a brake mechanism incorporating my invention and taken on the line 1—1 of Figure 2;

Figure 2 is a sectional view taken on substantially the line 2—2 of Figure 1;

Figure 3 is a fragmentary section similar to that shown in Figure 2 but illustrating the deformation of the drum caused by forcible application of the brakes;

Figure 4 is a view similar to Figure 3 but illustrating a slight modification and also illustrating the brake drum in true cylindrical form;

Figure 5:
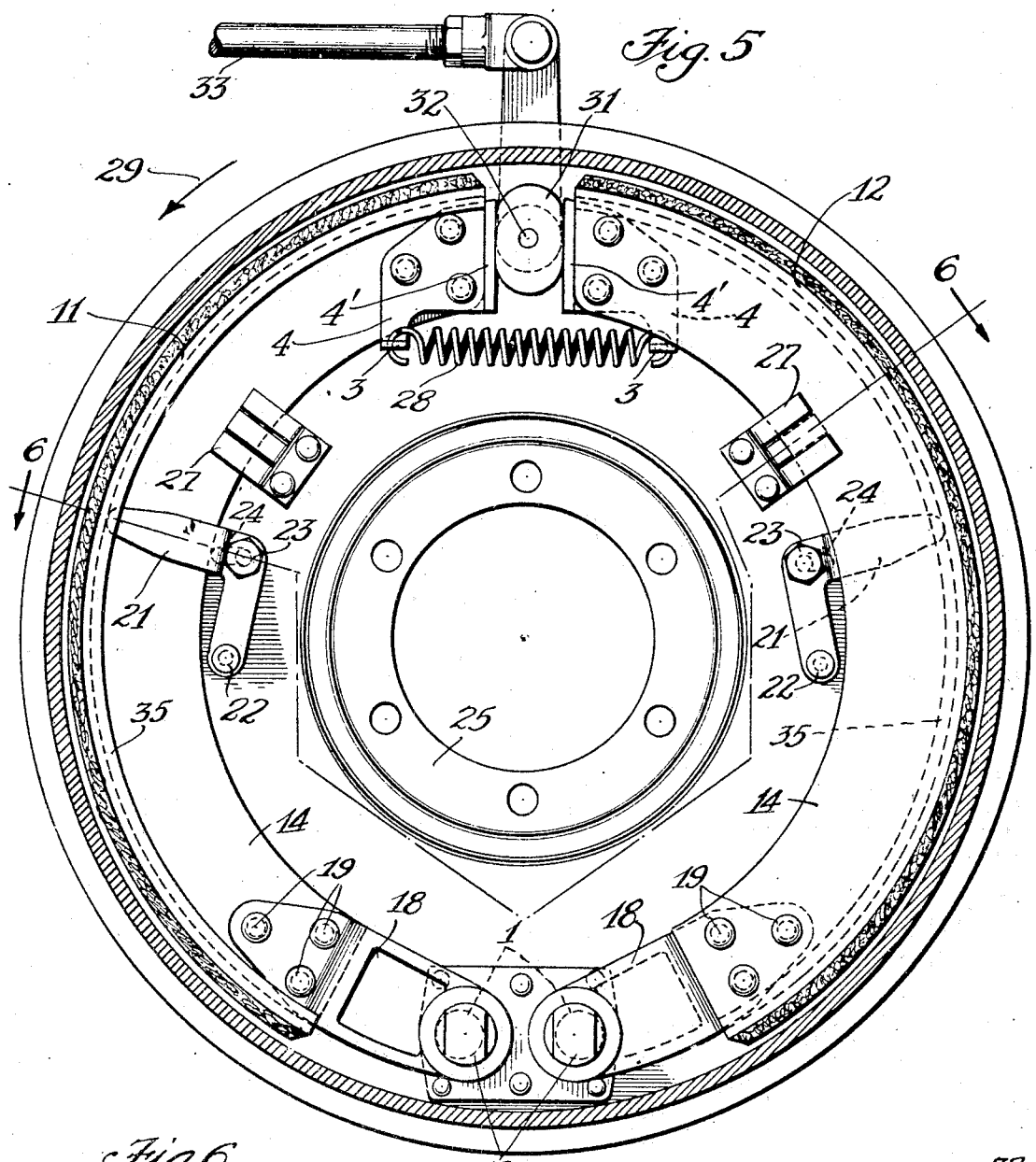
Figure 5 is a section similar to Figure 1 and taken on line 5—5 of Figure 6 but illustrating a modified form of the invention.

Referring to Figures 1 to 3 inclusive, the brake mechanism illustrated comprises any conventional type of pan 25 to which is secured a forward shoe 11 and a reverse shoe 12 by means of pivot pins 17 which are eccentrically fixed on bolts suitably secured to the pan 25 for the purpose of permitting adjustment of the lower end of the shoes to compensate for wear on the brake lining 13 secured on the friction face of the shoes 11 and 12. The brake drum 9 may be of any conventional form having a friction surface, one edge of which is free and the other edge of which is rigidly reinforced by the wide vertical flange 9' as shown in Figure 1.

The brake shoes are adapted to be forced into engagement with the drum by any suitable means such as piston rods 15 extending from a suitable cylinder 34 and adapted to be actuated by hydraulic pressure transmitted thereto in any conventional and well known manner. The shoes may be retracted from the drum by a suitable coil spring 28 engaging lugs 3 on the plates 4 which are rigidly secured to the flanges 14 of the shoes to take the thrust and wear of the actuating mechanism. The direction of movement of the brake drum in the forward movement of the vehicle is indicated by the arrow 29.

In the brake drum shown in Figure 1 the forward brake shoe 11 and the reverse brake shoe 12 are complementary, each having a working face to which the brake lining 13 is attached. One edge 5 of each shoe is free, while the other edge is reinforced by an integral flange 14. Force for the application of the brakes is transmitted solely through the flange 14 which more effectively permits the necessary deformation of the shoes for conforming to the deformation of the drum upon forcible application of the brakes as shown in Figure 3. The cross sectional areas of the drum and brake shoes are proportioned such that when forcibly actuated into engagement they will exert a uniform pressure across their width with the drum deformed in the manner shown in Figure 3, as well as when the drum is in true cylindrical form.

The shoe flanges 14 are supported adjacent their lower ends by arms 18 which are fixed thereto by rivets 19. Although the flanges 14 are on one edge of the shoes, the arms are offset sufficient that they may be pivoted at a point substantially in a plane passing through the center of the friction area whereby twisting of the shoes is effectively avoided. It is also possible to reverse one of the shoes if desired, which is the same as using identical shoes for the forward and reverse positions.

For the purpose of limiting the amount of retraction of the brake shoes and to prevent excessive lost motion, I provide a stop member 21 pivoted on the bolt 22 fixed to the pan 25. To provide adjustment to compensate for wear of the brake lining, the stop 21 is adjustable by means of a bolt 23 which passes through a slot 24 in the pan 25 which is normally secured to the axle housing or other relatively stationary part of the vehicle to which the brake is applied. The stop 21 is offset to cooperate with the shoe at substantially its mid point and is particularly designed to be equally well adapted for use with the shoes in the normal and reversed positions as hereinafter described with reference to Figure 5.

For keeping the shoes in proper alignment, I have provided an improved guiding device 27 consisting of two elements 7 and 8, the former of which lies along the pan 25 to space the flange 14 therefrom to provide for working clearance. The element 8 is formed into a plurality of prongs 10, which together with the element 7 provide a plurality of laterally spaced ways into one of which the flange 14 may pass, whether or not the shoe is in the reversed position as clearly shown by comparison of Figures 2 and 6.

The modification shown in Figure 4 is identical in all respects to that shown in Figures 1, 2 and 3, except that the portion of the brake shoe to which the brake lining 13 is applied is tapered from adjacent the reinforced edge toward the free edge in order to give it the necessary flexibility for uniformly applying pressure to the drum, which in this case is somewhat thinner and accordingly less rigid on the free edge.

Figure 6:
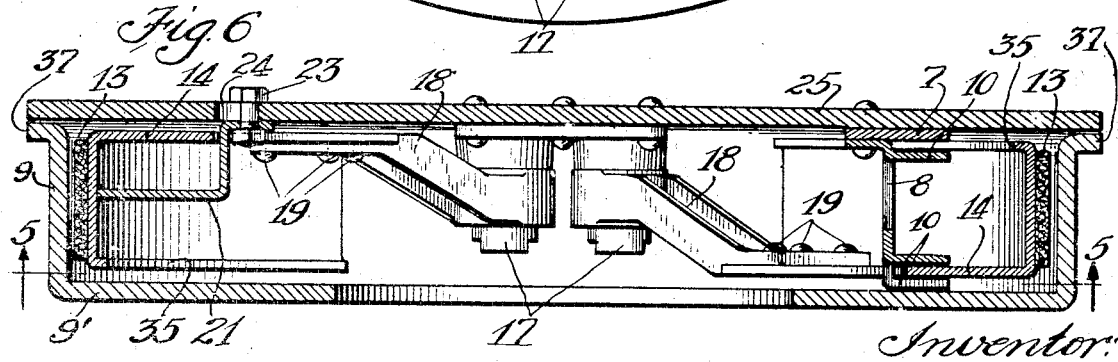
Figure 6 is a section taken on the line 6—6 of Figure 5.

Referring to the modification of my invention shown in Figures 5 and 6 I have illustrated a mechanical actuating mechanism comprising a cam 31 pivoted at 32 and a pull rod 33 to which force may be applied for causing the cam to forcibly press the shoes 11 and 12 against the drum 9. The cam 31 engages the abutments 4' on the plates 4 which take the wear and transmit force to the flanges 14 of the brake shoes.

The various elements of this modification which are substantially like those described with reference to Figures 1, 2 and 3 are designated by like reference numerals and further detailed description thereof is thought to be unnecessary. In this modification the drum 9 is provided with an outwardly extending flange 37 and shoes 11 and 12 are provided with inwardly extending flanges 35 which are weaker than flange 37 but so proportioned that the drum and shoes, although much more rigid at their free edges than they would be without the flanges 35 and 37, are adapted to yield in a manner similar to that shown in Figure 4 when the brakes are forcibly applied and the forward brake shoe 11 will cause a substantially equal distribution of force across its width.

It has been determined by experiment that on account of a so-called wrapping effect of the brake lining upon application of the brakes the forward shoe carries substantially 80% of the braking load in the forward movement of the vehicle. It is, therefore, relatively immaterial whether the reverse shoe be complementary to the forward shoe or whether it be a reversed identical shoe. I have, therefore shown in Figure 6 one shoe reversed, with its flange 14 fitting between the fingers 10 on the outer end of the guide element 8. The pan 25 is adapted equally well to support either or both brake shoes in their normal or reversed positions by the aid of the especially designed guides and stops above described.

As an aid to production in the factory it is advantageous to make all the brake shoes of a single pattern instead of making them in pairs. This may be done when the shoes are to be employed as illustrated without materially effecting the braking torque produced. This is also true when the brake drum is used on the drive shaft instead of on a wheel since the brake drums on the drive shafts of vehicles of one make will normally face in a given predetermined direction and by using identical shoes in them with the forward shoe in normal position and the other reversed substantially maximum braking torque will be obtained without the necessity of using shoes especially designed in pairs.

It will be understood that my invention is not limited to the specific embodiments herein shown and described but includes such other variations and modifications as may come within the scope of the appended claims.

I claim as my invention:

1. In a brake mechanism the combination of a rotatable friction member, with a non-rotatable cooperating friction member, force applying means for causing forced engagement of said members sufficient to cause deformation of said rotatable member, said members each having a free edge and a more rigid reinforced edge and being so disposed with relation to each other that the free edge of each is adjacent the more rigid edge of the other, said non-rotatable member being thinned from the reinforced edge toward the free edge, whereby the non-rotatable member is adapted to conform to the deformation of the rotatable member when said members are actuated into engagement.

2. In a brake mechanism the combination of a rotatable friction member having one free edge and a reinforcing flange on the other edge, with a non-rotatable member having one free edge and a reinforcing flange on the other edge, said members being disposed for frictional cooperation such that the reinforced edge of the one is adjacent the free edge of the other, and force applying means for causing forced engagement of said members, said non-rotatable member being thinned from the reinforced edge toward the free edge whereby one is adapted to conform to the deformation of the other upon forced engagement of the members.

3. In a brake mechanism the combination of a rotatable friction member, with a non-rotatable cooperating friction member, force applying means for causing forced engagement of said members sufficient to cause deformation of said rotatable member, said members each having a free edge and a more rigid reinforced edge and being so disposed with relation to each other that the free edge of each is adjacent the more rigid edge of the other, one of said members being thinned by tapering toward one edge whereby the thinned member is adapted to conform to the deformation of the other member when said members are forced into engagement.

4. In a brake mechanism the combination of a rotatable friction member having one free edge with a reinforcing flange on the other edge, with a non-rotatable member having one free edge and a reinforcing flange on the other edge, said members being disposed for frictional cooperation such that the reinforced edge of the one is adjacent the free edge of the other, and force applying means for causing forced engagement of said members, one of said members being non-uniform in thickness across its width whereby one is adapted to conform to the deformation of the other.

5. In a brake mechanism the combination of a drum having one edge more rigid than the other, with a brake shoe adapted to carry a brake lining and having one edge less rigid than the other, said shoe being disposed for cooperation with said drum such that the less rigid edge of the shoe is adjacent the more rigid edge of the drum and the more rigid edge of the shoe is adjacent the less rigid edge of the drum, said shoe being non-uniform in thickness across its width whereby the shoe is adapted to flex and conform to the shape of the drum when they are forced into engagement, means for aligning and guiding the shoe throughout its range of movement, and means for actuating said shoe into engagement with said drum.

In witness whereof, I hereunto subscribe my name this 20th day of January, 1930.

ERWIN F. LÖWEKE.